United States Patent [19]
McCandless

[11] Patent Number: 6,119,664
[45] Date of Patent: Sep. 19, 2000

[54] FUEL INJECTION SYSTEM FOR CLEAN LOW VISCOSITY FUELS

[75] Inventor: James C. McCandless, Grosse Pointe, Mich.

[73] Assignee: AVL Powertrain Engineering, Inc., Plymouth, Mich.

[21] Appl. No.: 09/160,427

[22] Filed: Sep. 24, 1998

Related U.S. Application Data

[62] Division of application No. 08/802,680, Feb. 19, 1997, Pat. No. 5,816,228.
[51] Int. Cl.$^7$ ..................................................... F02B 43/00
[52] U.S. Cl. ............................................. 123/527; 123/458
[58] Field of Search ................. 123/27 GE, 527, 123/506, 514, 456, 467, 458, 447

[56] References Cited

U.S. PATENT DOCUMENTS

| | | | |
|---|---|---|---|
| 4,421,087 | 12/1983 | Schuurman | 123/458 |
| 4,524,744 | 6/1985 | Adams | 123/456 |
| 4,627,403 | 12/1986 | Matsumura | 123/458 |
| 4,732,131 | 3/1988 | Hensel | 123/456 |
| 5,136,986 | 8/1992 | Jensen | 123/527 |
| 5,606,945 | 3/1997 | Sealock | 123/1 A |
| 5,690,078 | 11/1997 | Ofner | 123/527 |
| 5,711,274 | 1/1998 | Drummer | 123/456 |

*Primary Examiner*—Carl S. Miller
*Attorney, Agent, or Firm*—Brinks Hofer Gilson & Lione

[57] ABSTRACT

An internal combustion engine that is driven by fuels such as dimethyl ether (DME) that have a viscosity less than 1.0 and a storage and delivery system for the fuel that will reduce considerably the emissions of $NO_x$ and particulate. The fuel delivery system includes a fuel injector nozzle valve being forced closed by fuel that has leaked past a solenoid operated valve and is at a pressure less than the valve opening pressure.

10 Claims, 5 Drawing Sheets

FUEL INJECTION SYSTEM FOR CLEAN LOW VISCOSITY FUELS

This application is a division of application Ser. No. 08/802,680, filed Feb. 19, 1997, (pending).

BACKGROUND OF THE INVENTION

Air pollution is a serious problem especially in large cities. In the U.S. the Environmental Protection Agency has the primary responsibility for carrying out the requirements of the Clean Air Act, which specifies that air-quality standards shall be established for hazardous substances. There are also state laws and international Protocols that set standards.

Some air pollutants are formed through the action of sunlight on previously emitted reactive materials (called precursors). For example, ozone, a pollutant in smog, is produced by the interaction of hydrocarbons and nitrogen oxides under the influence of sunlight. Although many types of combustion contribute to this problem, trucks and buses have been identified as a significant source of both oxides of nitrogen ($NO_x$) and particulate matter (PM). Pollution from internal combustion engines has been significantly reduced by burning the fuel as completely as possible, by recirculating fumes and by using catalytic converters. However, standards are constantly being changed in an attempt to lower exhaust emissions. Current standards, for the year 2004, propose $NO_x$ emissions limits of about 2 grams per brake horse power per hour (g/bhp-hr). Meeting such standards will be difficult for spark ignited (SI) engines and even more difficult for diesel engines.

In trying to meet such standards alternative fuels such as Methanol and Ethanol have been tried. Dimethyl ether, $CH_3$—O—$CH_3$ hereinafter DME, is currently used as a propellant for spray cans. DME was adopted for this use as a replacement for chlorofluorcarbons. Recent studies have shown that DME is a promising new alternative fuel for compression-ignition (diesel) engines. Ultra-low exhaust emissions have been demonstrated with totally smoke free operation. Energy efficiency is equal to or better than conventional diesel engines. Exhaust gas reactivity is very low; and engine combustion noise is similar to gasoline engines. In addition, preliminary economical studies indicate that DME, when produced directly from natural gas, can be cost competitive with diesel fuel on an equal energy basis. Reference is made to U.S. Pat. No. 5,485,818 that discloses a Dimethyl Ether powered compression ignition internal combustion engine. U.S. Pat. No. 5,485,818 is hereby included by reference as a part of this disclosure.

However, conventional fuel injection equipment is not suitable for use with DME because of unacceptable internal leakage and the injection pumping rates are not appropriate. DME must be pressurized to about five bar to keep it in a liquid state under ambient conditions. At the elevated temperatures present on an internal combustion engine higher pressure (12–30 bar) is required to maintain DME in a liquid state.

The viscosity of DME is about 10% of diesel fuel and is extremely low compared to most other fuels. Diesel fuel has a kinematic viscosity at 20 degree Centigrade of 2.5–3.0 as compared to Methanol 0.75, Gasoline 0.6 and Dimethyl ether of 0.25.

The energy density of DME, although higher than the alternative fuels Methanol ($CH_3OH$) and Ethanol ($CH_3$—$CH_2$—OH). is much lower than conventional Diesel Fuel. Because DME has both lower density and heating values then conventional diesel fuel, volumetric flow rates of 1.7 times diesel fuel rates are necessary to achieve the same output. For example, in a six cylinder engine having an engine rate of 188 kw at 2,000 rpm, and an injection duration limit of 50 crank degrees, 250 cubic millimeters of DME must be delivered in 4 milliseconds. To accommodate this increased volume the fuel injector must have larger orifice openings.

A fuel's Cetane number, which is a measure of the fuel's ability to auto-ignite, has an important influence on diesel combustion and is a meaningful indicator of a fuel's value for diesel engines. Fuels with a high Cetane number will ignite quicker and thus will have a short ignition delay. This lowers premixed burning of the fuel, which in turn lowers $NO_x$ and noise emissions. DME has a higher Cetane number than Diesel Fuel and thus it will ignite quicker and will have a relatively short ignition delay. By throttling the amount of fuel injected during the initial portion of the injection cycle the quantity of fuel in the combustion chamber when ignition occurs is diminished. This significantly lowers $NO_x$ and noise emissions. The mechanism for throttling the fuel injected during the initial portion of the injection cycle should be time dependent such that it can be coordinated with ignition delay that is also time dependent.

Also, the vapor pressure of DME is higher than most other fuels. At 38° Centigrade, the vapor pressure of DME is 8 bar as compared to 0.0069 bar and 0.35 bar respectively for Diesel fuel and Methanol. Thus DME is a gas at atmospheric conditions, but becomes liquid under modest pressure (5 bar). Therefore, in order to inject liquid fuel into the engine, the entire fuel system from tank to injection tip, must be pressurized.

The bulk modulus of DME, which is a measure of its compressibility, varies greatly with both pressure and temperature. This attribute of DME renders accurate fuel metering with jerk pump type systems extremely difficult or impossible.

The kinematic viscosity of DME at 20° Centigrade is 0.25 as compared to 2.5–3.0 for diesel fuel. This relatively low viscosity of DME causes high internal leakage within the supply pump, solenoid valves and fuel injector. Thus, standard fuel storage and delivery systems are not suitable for DME.

Internal combustion engines and especially Diesel engines represent large capital investments and have long useful lives. The current process for producing DME would result in a price that would render it unacceptable as an alternative fuel. A new less costly manufacturing method has been developed to produce "raw DME" that is a form of DME that includes small amounts of water and Methanol. Large capital investments would be required to build the necessary facilities to produce raw DME at volumes that would meet its demand as an alternative fuel. Even greater capital investments would be required to provide the necessary refueling system. Large capital investments of this magnitude are unlikely to be made if the alternative fuel can only be used in newly produced special designed engines. Thus, it is likely that DME will be initially used only in urban areas where ozone and particulate matter exceed the congressionally mandated standards. A low volume niche market such as this will not justify major engine design changes or very high cost components. Thus, a very important consideration for DME as an alternative fuel is whether economical field conversions can be made to existing engines to enable them to use DME as an alternative fuel.

An early design concept for the use of DME employed liquid propane type fuel storage and delivery system, an axial piston type pump, an electronic pressure regulator valve to regulate injection pressures, a common rail which functioned as an energy storage device, a spool type 2-way solenoid valve and a conventional diesel injector nozzle. This system was tested as a computer model. This test uncovered several serious design flaws. Leakage around the closed solenoid spool valve resulted in small but uncontrolled injections. Leakage around the injection nozzle guide caused high fuel flow demand. Pump volumetric efficiency was poor and necessitated the use of a very large displacement pump. Thus, the overall system efficiency was very low which caused high fuel temperatures and necessitated the use of a large fuel cooler to control fuel viscosity & vapor pressure.

For the foregoing reasons there is a need for a DME storage and delivery system for internal combustion engines that will enable the favorable emission properties of DME to be exploited in new and existing engines.

For these reasons, there is a need for a fuel storage and delivery system that will enable internal combustion engines to be powered with DME fuel in a broad range of environmental conditions. The new and improved fuel storage and delivery system must also permit existing internal combustion engines to be economically converted in the field to be fueled by DME.

SUMMARY OF THE INVENTION

The present invention is directed to a fuel injection system for the direct injection of liquid dimethyl ether (DME) in a conventional diesel engine to achieve ultra-low emissions of oxides of nitrogen ($NO_x$) and particulate matter. This invention is also suitable for the direct injection of ethanol and methanol in compression-ignition engines and the direct injection of liquid propane and gasoline in spark-ignition engines. The present invention will also enable existing engines fueled by conventional fuel to be economically converted to use DME and other alternative fuels.

The present invention is directed to a fuel storage and delivery system including a fuel pump that has low internal leakage to accommodate the low viscosity of the DME.

The injector nozzles used in this invention can provide the increased volume of DME fuel required in the same cylinder rotation arc that is required in an engine using diesel fuel.

To achieve very low $NO_x$ and combustion noise emissions, the fuel quantity injected during the ignition delay period must be very small. The injection system of this invention controls the rate at which the DME is injected and thus reduces the premixed fuel quantity and avoids noisy combustion and high $NO_x$ emissions.

The nozzle orifice area of this invention is relatively large to accommodate for the lower density and heating value of DME.

High injection pressures are not required for DME because it does not produce soot emissions and it immediately vaporizes when injected into the cylinder. It is, of course, necessary to have a positive pressure difference between the fuel and cylinder sufficient to produce the required fuel delivery and to satisfy nozzle opening and closing pressure considerations.

This invention provides flexible injection timing to optimize the tuning of the engine and to gain low emissions.

This invention consists of a short circuit fuel line in the fuel delivery system extending between the high pressure solenoid discharge and the low pressure fuel return.

This invention further consists of an orifice and a pressure regulator in the short circuit fuel line that extends between the high pressure solenoid and the low pressure fuel return.

This invention also consists of a leakless injection nozzle that is biased closed by pressurized fuel that leaks past the solenoid valve and the injection nozzle guide.

This invention further comprises a method of regulating the pressure of the fuel that leaks past the solenoid spool to selected predetermined levels all of which are below the injection valve opening pressure.

This invention also consists of adding volume to the injection nozzle spring cavity to create a soft fluid spring.

DETAILED DESCRIPTION OF THE PREFERRED EMBODIMENT

Figure 1:
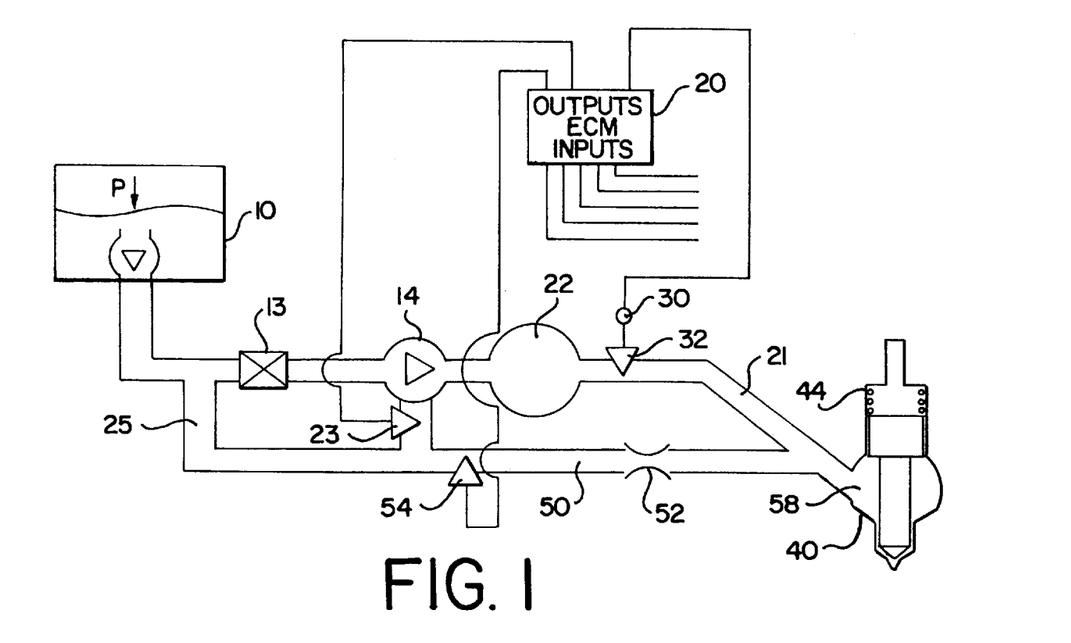
FIG. 1 is a schematic view of an embodiment of the invention.

There is shown in FIG. 1 a schematic view of an embodiment of the invention in which an Electronic Control Module (ECM) 20 includes a microprocessor that receives inputs from various engine monitors such as fuel temperature, fuel rail pressure, throttle position, engine revolutions per minute and cam angle. The ECM 20 is programmed with the operating strategy of the system and controls the operation of the entire fuel system. Engine conditions such as oil temperature, ambient air temperature, barometric pressure and exhaust back pressures are monitored and imputed to the ECM. The ECM 20 computes output control signals that are sent to engine components such as the solenoids 30. In these way solenoids 30 are actuated at a precise time in the engines operating cycle. The output control signal sent to the solenoids 30 determines the time for starting fuel injection and the duration of each injection. The output signal that is sent to the Rail Pressure Modulator Valve (RPMV) 23 represents the desired rail pressures for the specific engine conditions calculated according to the operating strategy of the system and in response to the data collected by the various monitors. The RPMV 23 functions to control the output pressure of the pump 14 that determines the pressure of the DME in the common rail 22. For a more detailed description of how injector solenoid 30 is energized reference should be had to the above identified U.S. Pat. No. 5,485,818. The ECM 20 is also programmed to compute desired back pressures for the back pressure regulator 54 and conveys signals to the back pressure regulator 54.

The fuel is stored in a pressurized fuel tank 10 from which it is fed by a pump 14 to a rail 22 that functions as an accumulator. Fuel is distributed from the accumulator to unit injectors 40. Rail 22, dispenses fuel to all of the engine's cylinders, and functions to assure a constant fuel pressure to all injectors 40. A Rail Pressure Modulator Valve (RPMV) 23 functions to control the output pressure of the pump 14 and thus determines the pressure of the DME in the common rail 22. The RPMV also functions as a relief valve to prevent DME, at excess pressures, from being sent to the rail 22. As is fully disclosed in U.S. Pat. No. 5,485,818 the rail pressure is monitored by a transducer that transmits data back to the ECM 20.

In FIG. 1 a single fuel passage 21 and injector 40 have been illustrated, however it should be understood that if the rail 22 is being used on a four or six cylinder engine the rail would have a passage 21 for each combustion cylinder. In the preferred embodiment of the invention the rail 22 is secured to the engine block and an injector solenoid 30 is provided in the rail 22 for each combustion cylinder. A fuel passage 21 extends from each solenoid operated valve 32 to its respective injector inlet cavity 58. When solenoid 30 is energized, by a signal from the ECM 20, the solenoid operated valve 32 is opened. Valve 32 is normally held closed by a spring or by a magnetic force. When the valve 32 is opened by the solenoid 30, the DME flows through the fuel passage 21 into the inlet cavity 58 of the injector 40. As a result of DME's very low viscosity, fuel leaks past solenoid operated valve 32. In test devices this leakage resulted in unintended injections of fuel into the cylinders. Efforts were made to eliminate the fuel leakage past solenoid 30 however these efforts were not successful. The fuel injection system of this invention utilizes the fuel that leaks past solenoid actuated valve 32 to force the injection nozzle 90 to a closed position.

A short circuit line or conduit 50, as seen in FIG. 1, was added to the circuit. Short circuit line 50 is connected at one end to fuel passage 21 and at its other end to the low pressure fuel return 25. Since the fuel passage 21 flows into the inlet cavity 58 of the injector 40, the short circuit line 50 is also in fluid communication with the inlet cavity 58 of the injector 40. A constriction, for example an orifice 52, is provided in short circuit line 50 that functions to restrict or resist the flow of fuel through to the short circuit line 50. The short circuit line 50 also includes a back pressure regulator 54 that is set to open at a pressure that is less than the valve opening pressure of the injector nozzle 90. Thus, when pressurized liquid fuel leaks past the solenoid operated valve 32, and flows toward the inlet cavity 58 through line 21, it also flows into the short circuit 50 where it encounters the orifice 52. After the liquid fuel has flowed through the orifice the back pressure regulator 54 is encountered. The back pressure regulator 54 can be controlled by electronic signals from the ECM 20 too open and allow fuel flow to the low pressure return 25 at selected pressures. Although the back pressure regulator 54 can be controlled to open at various pressures, the opening pressure will always be lower than the injector valve opening pressure. Fuel leaking past valve 32 will cause a gradual increase in the pressure in inlet cavity 58. When fuel that has leaked past solenoid valve 32 increases to the set pressure of the back pressure regulator 54, then the back pressure regulator 54 opens and allows the fuel to flow through the low pressure return back to the pump 14. As a result fuel leakage past the solenoid valve 32 will never reach the valve opening pressure of the injector nozzle.

When the solenoid 30 is energized and the valve 32 opens, high pressure fuel rushes to the inlet cavity 58 causing injector nozzle 90 to open. When nozzle 90 opens fuel is injected into the combustion cylinder. The high pressure fuel is restricted for a sufficient time, by orifice 52, to permit injection to occur. Without orifice 52, the high pressure fuel released by solenoid valve 32 would reach the back pressure regulator 54 at substantially the same time that it reaches the injection inlet cavity 58. This would, as a result of regulator 54 being set for a pressure that is less than the valve opening pressure, prevent injection from occurring. This high pressure fuel would open the back pressure regulator 54 and pressure in fuel passage 21 would fall to a level that would prevent the injector nozzle 90 from opening. Thus, orifice 52 performs a very important function in this invention.

Figure 2:
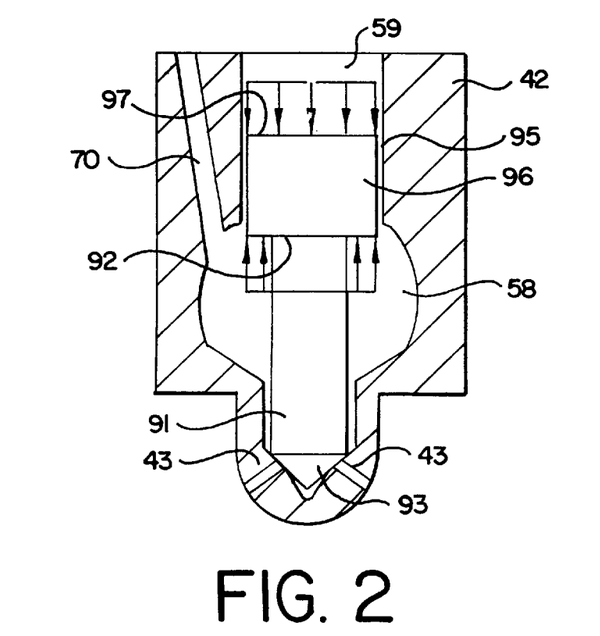
FIG. 2 is schematic cross section view of a portion of the injector.

As best seen in FIG. 2, which is a schematic view of a portion of injector 40, the injector nozzle 90 includes a piston like portion 96 that slide in corresponding cylindrical bore 95 formed in the injector body 42 to thus guide and allow the nozzle 90 to reciprocate longitudinally in the injector body 42. There is clearance between surfaces 95 and 96 that is sufficient to allow pressurized liquid fuel to flow from the injection inlet cavity 58 to an upper cavity 59. The upper surface 97 of the piston like portion 96 of injector nozzle 90 is exposed to the upper cavity 59. The nozzle pin 91 extends downward from the lower surface 92 of the piston like portion 96 of injector nozzle 90 and terminates in a conical shaped point 93. As a result of the nozzle pin 91 the surface area of upper surface 97 of the piston like portion 96 is greater than the surface area of its lower surface 92. The fluid that leaks past solenoid 30 into injector cavity 58 then leaks through the clearance between the surfaces 95 and 96. Although the pressure on both sides 97 and 92 of piston like portion 96 is the same, as a result of the difference in surface areas, an unbalanced force acts on the nozzle 90 forcing it in the closed direction. When nozzle 90 is forced downwardly, as seen in FIG. 2, the conical shaped point 93 closes the spray orifices 43 formed in the injector body 42.

Figure 3:
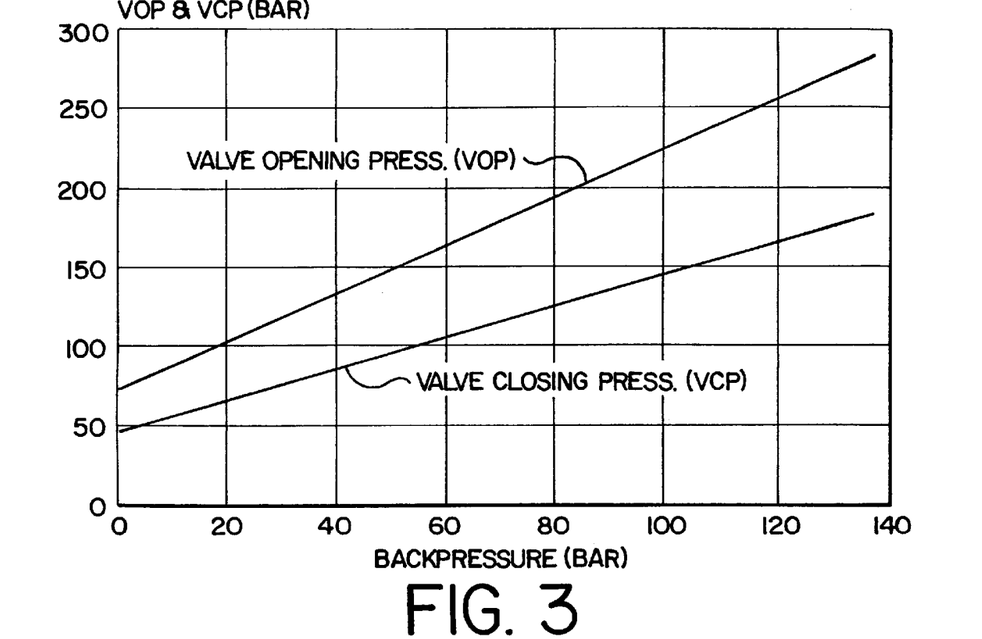
FIG. 3 is a chart showing valve opening and valve closing pressures plotted against back pressure.

As illustrated in FIG. 3 as back pressure is varied, the injector nozzle valve opening pressure changes. This change in valve opening pressure is caused by the differential areas effected. This is a very beneficial unexpected result of this system since it allows the use of very low rail pressures at light loads, This feature of the invention is utilized to lower pump parasitic power and correspondingly engine fuel consumption.

Figure 4:
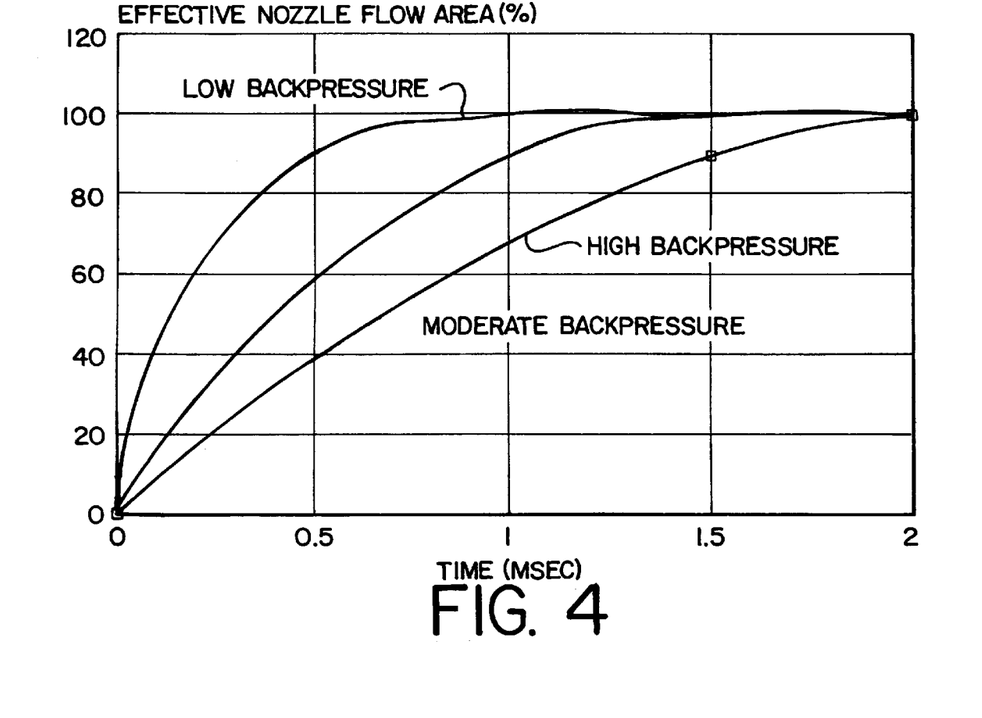
FIG. 4 is a chart showing effective nozzle flow area plotted against time for low, moderate and high back pressure.

The back pressure acting on the upper 97 and lower 92 surfaces of the piston like portion 66 of injector nozzle 90 effects the initial injection flow rate. Reference is made to FIG. 4 where low, moderate and high back pressure curves are plotted on a chart having time in milliseconds on the abscissa and percent effective nozzle flow area on the ordinate. FIG. 4 illustrates that at low back pressure the effective nozzle flow area reaches 100% in about 1 millisecond while at high back pressure it takes about 2 milliseconds to reach 100%. At any given nozzle inlet pressure, the forces acting to open the nozzle needle are proportional to the back pressure in the system. If back pressure is high, the needle of the injector nozzle 90 will open slowly because the net forces acting to move the needle are low. On the other hand, if back pressure is low, the needle will open rapidly. The opening velocity of the needle has a marked effect on initial nozzle flow area and therefor on initial injection flow rate.

Figure 5:
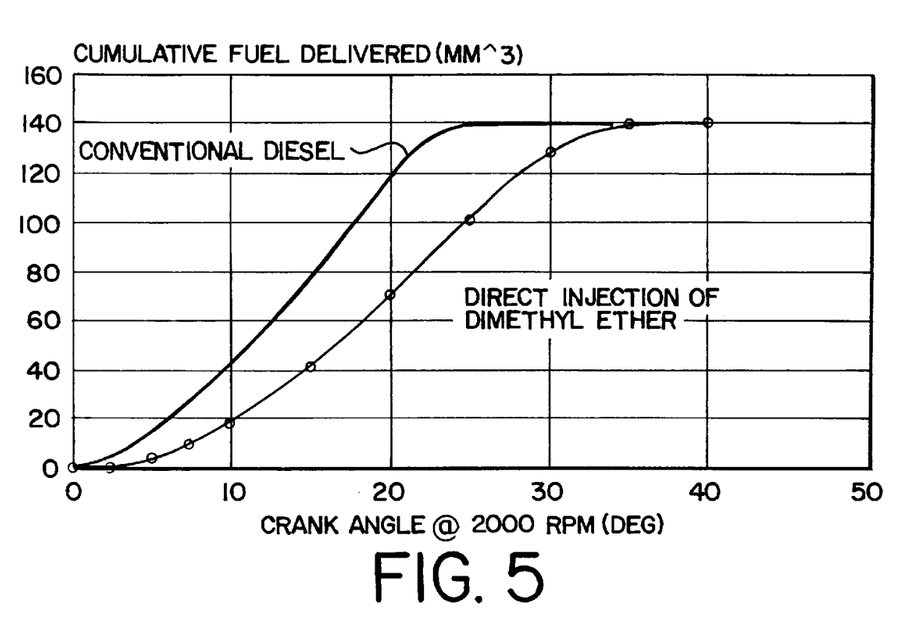
FIG. 5 is a chart in which cumulative fuel delivered is plotted against crank angle for an engine powered by conventional diesel fuel and an engine powered by dimethyl ether.

FIG. 5 is a chart including curves plotting the injection flow rate of a conventional diesel injection system and the injection flow rate of the embodiment of this invention in which dimethyl ether is direct injected into the cylinders These curves are based upon equal energy and clearly illustrate that the initial injection flow rate for this invention is significantly lower than in the conventional diesel system. As a result of injecting smaller amounts of fuel during initial ignition very low $NO_x$ and combustion noise emissions are attained Thus, by controlling the rate at which the DME is injected during initial injection the premixed fuel quantity is reduced resulting in the avoidance of noisy combustion and high $NO_x$ emissions.

Figure 6:
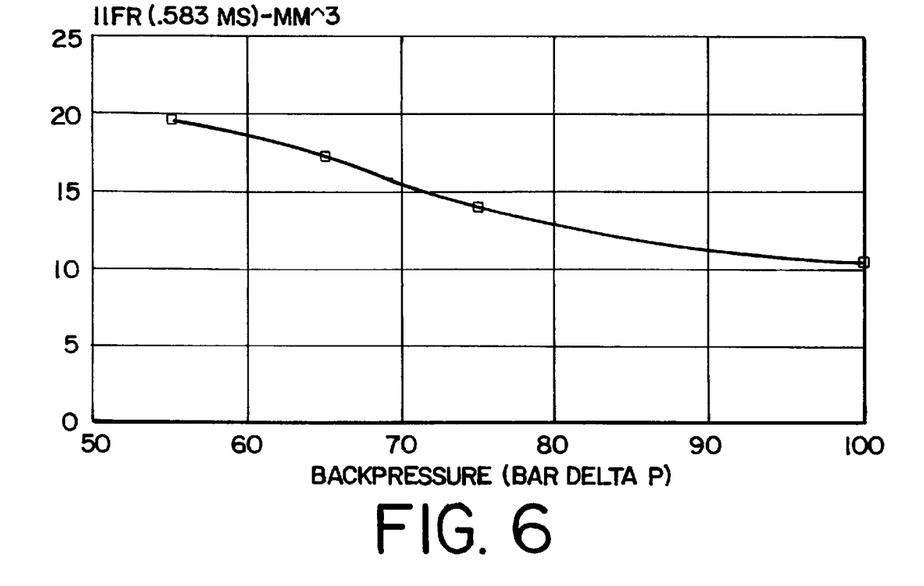
FIG. 6 is a chart in which initial injection flow rate is plotted against back pressure.

FIG. 6 is a chart in which back pressure is plotted on the abscissa and initial injection flow rate on the ordinate. Since back pressure can be regulated by adjustment of the back pressure regulator 54, the initial injection flow rate can be regulated, controlled and adjusted. The back pressure regulator 54 is regulated by signals from the ECM.

Figure 7:
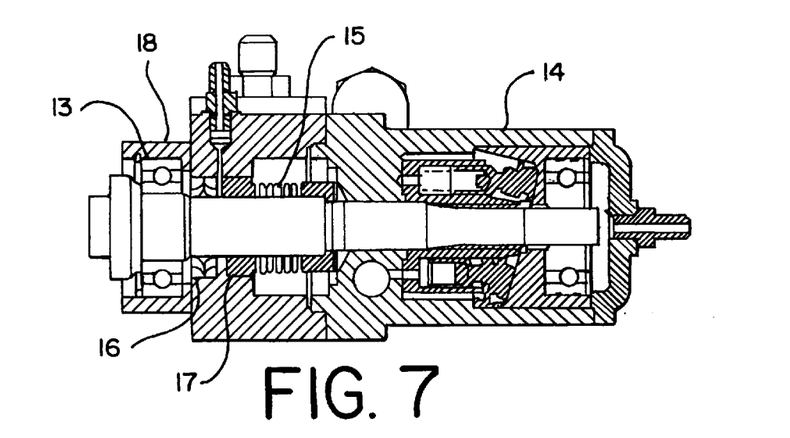
FIG. 7 is a cross section view of a fuel pump developed to supply dimethyl ether to an internal combustion engine.

The fuel pump 14 must be able to provide DME to the rail 22 at a pressure in the range of 100–300 bar. The fuel supply pump 14 can be driven by the engine, at a speed ratio of engine speed to pump speed in the range of 1:1 to 1:0.5. Pump 14 must have the capacity to meet the engine's peak torque requirements. At peak torque an engine is rotating at a relatively high rate, and accordingly drives the fuel pump at a relatively high rate. At this high speed a gear type pump would have high efficiency even when pumping DME which has a very low viscosity. The viscosity of DME is about 10% of the viscosity of Diesel fuel. Thus, a gear type pump would perform adequately when the engine is operating at peak torque speeds. However, another critical requirement for the fuel pump 14, is that it must be able to supply sufficient fuel to the engine during start-up. At start-up the engine and therefore the pump 14 will be running at a relatively low speed. A diesel engine that delivers peak torque at speeds of 2,000 rpm will have a start-up speed of about 200 rpm. A conventional gear type fuel pump has a very low efficiency at 200 rpm. Because of the low viscosity of DME a conventional gear type fuel pump could not start an engine. The low speed combined with the low viscosity of DME fuel affords time for the fuel to leak internally around the gears of the pump. As a result of this inefficiency, caused by internal leakage, a conventional gear type fuel pump can not manage the critical engine start-up requirements. As the engine speed and the corresponding pump speed increases there is less time for internal leakage and consequently there is less leakage. For these reasons a highly efficient pump is necessary when using DME as a fuel. Test performed with a conventional piston type pumps had an efficiency of about 40%, which was not acceptable for use with this invention. The pump 14, that was developed for use with this invention is shown in FIG. 7.

Figure 8:
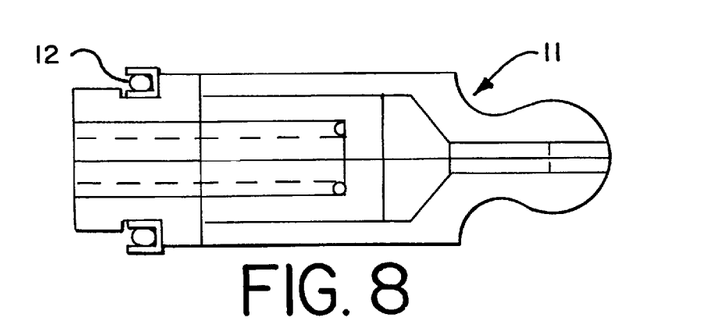
FIG. 8 is a cross section view of a plunger for the fuel pump shown in FIG. 7.

Pump 14 is gear driven and replaces the conventional diesel injection pump. Pump 14 is capable of 250 bar pressure and includes a bellows type, carbon/ceramic rotating shaft seal 15 that functions to contain housing pressure of up to 30 bar. A teflon dual lip seal 16 functions to contain any fuel that might seep past the face seal 17. The cavity between the lip seal 16 and the face seal 17 is vented back to the engine air inlet. Pressure in the vent line is monitored continuously. If the pressure increases significantly, indicating shaft seal failure, the fuel supply is turned off. A special adapter housing 18 is provided to package the seals, drive shaft 19 and front bearing 13. As illustrated in FIG. 8 teflon plunger seals 12 are used to improve leakage and the plungers 11 are coated with titanium nitride for better wear and to resist scuffing. Also a gas nitrided steel cylinder barrel and titanium nitrided steel plunger strippers are used.

Figure 9:
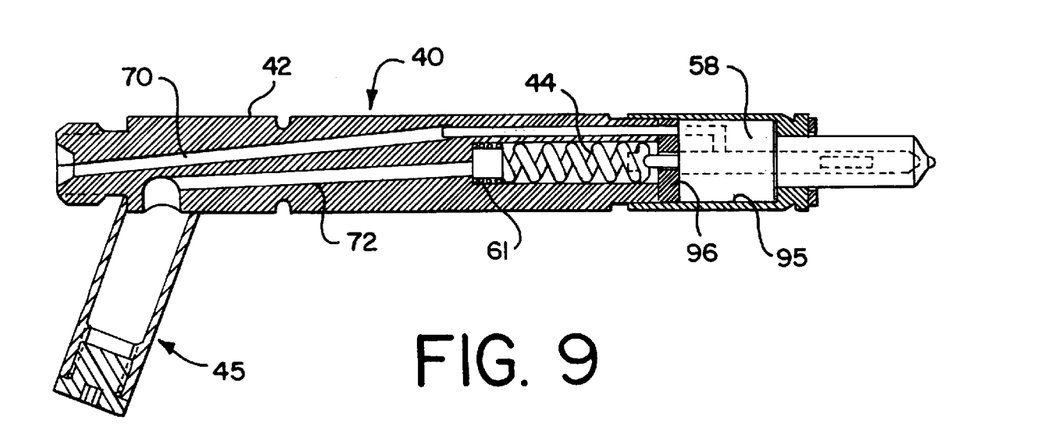
FIG. 9 is a cross section view of the injector.

A cross section view of the injector 40 is shown in FIG. 9. The injector 40 has a cylindrical shaped body portion 42 that conforms to the shape and dimensions of a standard 17 millimeter injectors that are currently used in diesel engines available from most engine sources. Thus existing conventional diesel engines can receive injectors 40. As seen in FIG. 9 fuel from fuel passage 21 inters the injector 40 though conduit 70 that is formed in the injector body 42. The conduit 70 opens into the inlet cavity 58. Fuel that has leaked past the solenoid operated valve 32 flows through conduit 70 into inlet cavity 58 and then through the clearance between the piston like portion 96 of the nozzle 90 and the cylindrical bore 95 formed in the injector body 42 into the upper cavity 59. The pressurized fuel in the upper cavity 59 exerts a force on the upper surface 97 of nozzle 90 which forces the nozzle into the closed position. It is noted that the upper surface 97 of nozzle 90 has a greater surface area than the lower surface 92 which results in the resultant closing force. A coil spring 44 having a relatively low rate of about 50 pounds per inch is located in upper cavity 59. One end of coil spring 44 engages the upper surface 60 of upper cavity 59 and the other end bears against the upper surface 97 of nozzle 90. As shown in FIG. 9 shims 61 can be provided between the coil spring 44 and the upper surface 60 of the upper cavity to adjust the pre load of spring 44. The upper cavity 59 empties into a conduit 72 formed in the injector body 42. A volume tube 45 is secured to the outer surface of injector 40. The internal cavity of volume tube 45 communicates with conduit 72. The volume tube 45 is plugged and functions to add a large volume to the spring chamber which essentially functions to eliminate pressure buildup due to nozzle lift. The low rate of coil spring 44 permits the nozzle 90 to achieve full lift with minimum pressures. When solenoid operated valve 32 is energized the high pressure fuel enters the inlet cavity 58, and exerts a force on lower surface 92 of the nozzle 90 causing the conical shaped point 93 to lift off the spray orifices 43 permitting injection of fuel in the combustion cylinder. Since the clearance between the piston like portion 96 and the cylindrical bore 95 is small the high pressure flue released by the solenoid valve 32 does not reach the upper surface 97 of the nozzle 90 before injection occurs. The high pressure fuel released by the solenoid operated valve 32 compresses coil spring 44 and the volume in the spring chamber. When solenoid valve 32 closes and the pressure in inlet cavity 58 diminishes the coil spring 44 and the spring chamber force the nozzle 90 back to its closed location.

As seen in FIG. 9, the been provided with a Valve Covers Orifice (VCO) type nozzle 90, that has five spray orifices that have a diameter of 0.60 millimeters. The valve lift of nozzles 90 is 0.6 millimeters. Details of the nozzle 90 are shown in greater detail in FIG. 2. A coil spring 44 (not included in FIG. 2) is contained in the upper cavity 59 that bears against upper surface 97. The other end of coil spring 44 bears against the top surface 60 of upper cavity 59 or a shim 61 placed between the other end of coil spring 44 and the top surface of upper cavity 59. The shims 61 enable the force of coil spring 44 to be adjusted.

Other modifications necessary to convert a conventional diesel engine from diesel fuel to DME are relatively minor and it will be possible to convert existing diesel engines to DME fuel.

Figure 10:
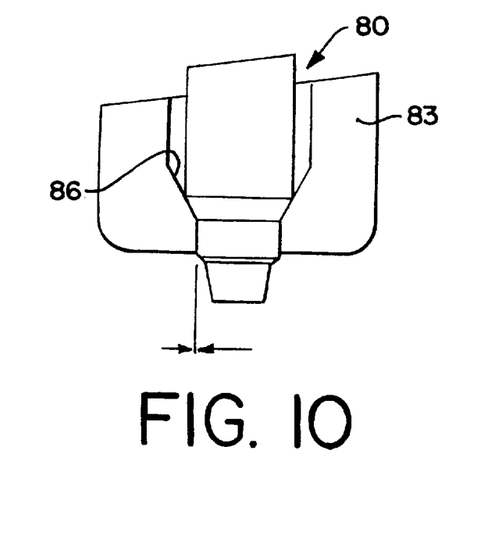
FIG. 10 is a detailed view of an embodiment of a pintle nozzle in the closed position.
Figure 11:
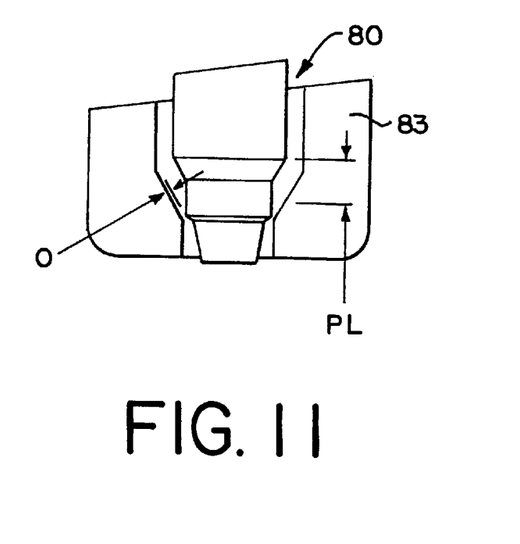
FIG. 11 is a detailed view of the pintle nozzle of FIG. 10 in a slightly raised or open position.
Figure 12:
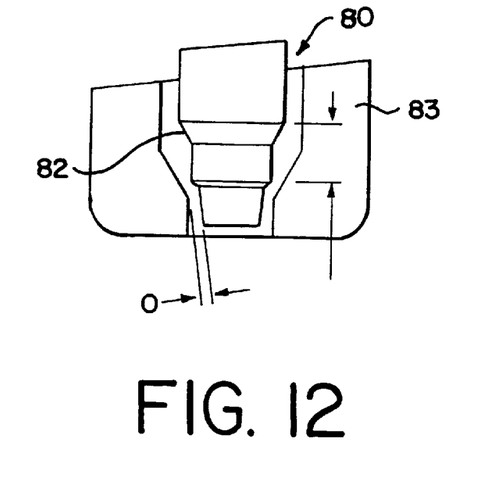
FIG. 12 is a detailed view of the pintle nozzle of FIG. 10 in a greater raised or open position then shown in FIG. 11.
Figure 13:
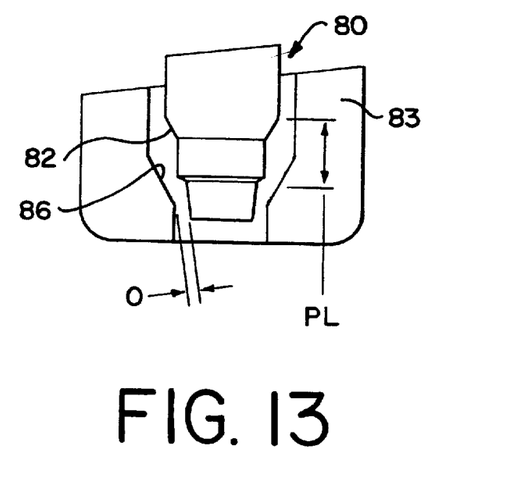
FIG. 13 is a detailed view of the pintle nozzle of FIG. 10 in a fully raised or open position.

When using the fuel injection system of this invention for gasoline and liquid propane a pintle type nozzle can be used. The single hole design feature of a pintle nozzle functions well to provide the increased fuel flow necessary when using these fuels Pintle type nozzles have the characteristic of increasing the flow area as the pintle is lifted. This feature is best illustrated in FIGS. 10 through 13. In FIG. 10 a first beveled portion 82 of the pintle nozzle 80, located at the discharge end of the pintle nozzle, is seated on a corresponding beveled portion 86 of the body 83 and the flow area is zero and accordingly there is no flow. It should be noted that there is a slight clearance between the corresponding cylindrical portions of the pintle and body below the first beveled portion 82 and the beveled portion 86. In FIG. 11 the pintle 80 has been lifted slightly, indicated by the letters PL, and the orifice, indicated by the letter O, has opened slightly. In FIG. 12 the pintle 80 has been further lifted and the flow area of the orifice has increased. In FIG. 13 the pintle 80 is fully lifted and the flow area of the orifice is at its maximum. Reference can be had to U.S. Pat. No. 5,485,818 for a further discussion of a pintle type nozzle.

While the invention has heretofore been described in detail with particular reference to an illustrated apparatus, it is to be understood that variations, modifications and the use of equivalent mechanisms can be effected without departing from the scope of this invention. It is, therefore, intended that such changes and modifications are covered by the following claims.

What is claimed is:

1. An internal combustion engine that uses dimethyl ether as a fuel, said engine including a plurality of combustion cylinders and a fuel storage and delivery system, said fuel storage and delivery system, comprising:

a pressurized fuel storage tank, an accumulator system connected by a conduit to said pressurized fuel storage tank, an engine driven fuel pump, having an inlet and an outlet, in said conduit that has the capacity to deliver fuel from said pressurized fuel storage tank to said accumulator system at a pressure in the range of 100–300 bar;

an injector for each combustion cylinder;

a fuel injection system including an electronically controlled valve that is activated to control injection timing and duration for each combustion cylinder, said electronically controlled valve connected to said accumulator system, a cylinder inlet conduit extending from each of said electronically controlled valves to each injector, each injector including a nozzle mounted for movement in said injector in response to the presence of pressurized fuel to open into the combustion chamber, said nozzle when fully opened will supply sufficient fuel flow to achieve full load power and maintain thermal efficiency, a short circuit conduit extending from said cylinder inlet conduit to the inlet of said engine driven pump, said short circuit conduit having a flow constriction that resist the flow of fuel thorough the short circuit conduit.

2. An internal combustion engine that uses dimethyl ether as a fuel, said engine including a plurality of combustion cylinders and a fuel storage and delivery system, said fuel storage and delivery system, comprising:

a pressurized fuel storage tank, an accumulator system connected by a conduit to said pressurized fuel storage tank, an engine driven fuel pump, having an inlet and an outlet, in said conduit that has the capacity to deliver fuel from said pressurized fuel storage tank to said accumulator system at a pressure in the range of 100–300 bar;

an injector for each combustion cylinder;

a fuel injection system including an electronically controlled valve that is activated to control injection timing and duration for each combustion cylinder, said electronically controlled valve connected to said accumulator system, a cylinder inlet conduit extending from each of said electronically controlled valves to each injector, each injector including a nozzle mounted for movement in said injector in response to the presence of pressurized fuel to open into the combustion chamber, said nozzle when fully opened will supply sufficient fuel flow to achieve full load power and maintain thermal efficiency, a short circuit conduit extending from said cylinder inlet conduit to the inlet of said engine driven pump, said short circuit conduit having a flow constriction that resist the flow of fuel thorough the short circuit conduit; and said short circuit conduit including a pressure regulator valve between said flow constriction and the inlet of said engine driven fuel pump.

3. The invention as set forth in claim 2 wherein the invention further comprises:

said internal combustion engine includes an electronic control module that is programmed with the operating strategy of the engine and receives inputs from engine monitors and sends signals to control the operation of the fuel delivery system, said electronic control module being programed to control said pressure regulator valve.

4. An internal combustion engine that uses dimethyl ether as a fuel, said engine including a plurality of combustion cylinders and a fuel storage and delivery system, said fuel storage and delivery system, comprising:

a pressurized fuel storage tank, an accumulator system connected by a conduit to said pressurized fuel storage tank, an engine driven fuel pump, having an inlet and an outlet, in said conduit that has the capacity to deliver fuel from said pressurized fuel storage tank to said accumulator system at a pressure in the range of 100–300 bar;

an injector for each combustion cylinder;

a fuel injection system including an electronically controlled valve that is activated to control injection timing and duration for each combustion cylinder, said electronically controlled valve connected to said accumulator system, a cylinder inlet conduit extending from each of said electronically controlled valves to each injector, each injector including a nozzle mounted for movement in said injector in response to the presence of pressurized fuel to open into the combustion chamber, said nozzle when fully opened will supply sufficient fuel flow to achieve full load power and maintain thermal efficiency, a short circuit conduit extending from said cylinder inlet conduit to the inlet of said engine driven pump, said short circuit conduit having a flow constriction that resist the flow of fuel thorough the short circuit conduit; and said injector includes a fuel inlet cavity and a cylindrical bore formed therein that communicates with said fuel inlet cavity;

said nozzle including a cylindrical like portion that slides, with clearance, in said cylindrical bore formed in the fuel injector;

the surface area of said cylindrical like portion that is exposed to fuel under pressure in said fuel inlet cavity is less than the surface area of said cylindrical like portion that is exposed to fuel under pressure that has passed from said fuel inlet cavity through said clearance such that the fuel pressure places a downward closing pressure on said nozzle.

5. A method of fueling an internal combustion engine, having combustion cylinders, with fuel that has a liquid viscosity of less than 1.0 comprising the steps of:

(a) storing the fuel in a pressurized fuel storage tank;

(b) pumping the fuel from the pressurized fuel storage tank to an accumulator;

(c) controlling the flow of fuel from the accumulator to the combustion cylinders by electronically actuated valves, (d) providing a short circuit conduit for fuel that has leaked past said electronically controlled valve to return to be pumped back to the accumulator, (e) restricting the flow of fuel through said short circuit; actuating said electronically actuated valves in timed sequence and for predetermined durations to initiate the fuel flow to the combustion cylinders.

6. The invention as set forth in claim 5 wherein the invention further comprises:

said internal combustion engine being fueled by dimethyl ether.

7. The invention as set forth in claim 5 wherein the invention further comprises:

said internal combustion engine being fueled by methanol.

8. The invention as set forth in claim 5 wherein the invention further comprises:

said internal combustion engine being fueled by ethanol.

9. The invention as set forth in claim 5 wherein the invention further comprises:

said internal combustion engine being of the spark ignited type and fueled by gasoline.

10. The invention as set forth in claim 5 wherein the invention further comprises:

said internal combustion engine being of the spark ignited type and fueled by liquid propane.

* * * * *

UNITED STATES PATENT AND TRADEMARK OFFICE
CERTIFICATE OF CORRECTION

PATENT NO. : 6,119,664
DATED : September 19, 2000
INVENTOR(S) : James C. McCandless It is certified that error appears in the above-identified patent and that said Letters Patent is hereby corrected as shown below:

Claim 1, Col. 9, line 55, change "resist" to -- resists --;

Col. 9, line 55, change "thorough" to -- through --.

Claim 2, Col. 10, line 18, change "resist" to -- resists --;

Col. 10, line 28, change "thorough" to -- through --.

Claim 3, Col. 10, line 30, change "programed" to -- programmed --.

Claim 4, Col. 10, line 59, change "resist" to -- resists --;

Col. 10, line 59, change "thorough" to -- through --.

Signed and Sealed this

Twenty-second Day of May, 2001

*Attest:*

NICHOLAS P. GODICI

*Attesting Officer*     *Acting Director of the United States Patent and Trademark Office*